March 7, 1967  M. KATZ  3,308,376

AREA MEASUREMENT OF IRREGULAR SHAPES

Filed Oct. 31, 1963

MATTHEW KATZ
INVENTOR.

BY *S. A. Giarratana*
*Francis L. Masselle*
ATTORNEYS

United States Patent Office 3,308,376
Patented Mar. 7, 1967

3,308,376
AREA MEASUREMENT OF IRREGULAR SHAPES
Matthew Katz, Brooklyn, N.Y., assignor to General Precision Inc., Little Falls, N.J., a corporation of Delaware
Filed Oct. 31, 1963, Ser. No. 320,377
1 Claim. (Cl. 324—61)

This invention relates to methods for determining the area of irregularly-shaped layers of electroconductive material such as the conductors of a printed circuit board.

Due to the highly irregular configuration of the conductive regions of printed circuit boards, a measurement of total conductor area has long presented a problem in the industry. The problem is compounded by the fact that individual conductive strips are very narrow and closely spaced to achieve a compact arrangement; moreover, area measurement must be accomplished without actual physical damage to or indirect deleterious effect upon the printed circuit pattern.

It is, therefore, the fundamental general object of the present invention to provide a solution to the problem outlined above.

A more specific object is the provision of a simple, reliable method for measuring irregular conductive areas such as printed circuit patterns quickly, easily, accurately, and without damage to the circuit.

To the fulfillment of these and additional objects, the present invention contemplates a method which comprises providing a laminated sheet consisting of an electroconductive layer and a dielectric layer; determining the capacitance, $C_o$, of a known partial area of the laminated sheet; placing the unknown conductive area in intimate surface contact with the dielectric surface of the laminated sheet; measuring the capacitance, $C_x$, between the electroconductive layer and the unknown conductive area; and calculating the unknown area from the known area and the ratio of capacitances $C_o$ and $C_x$.

Figure 1:
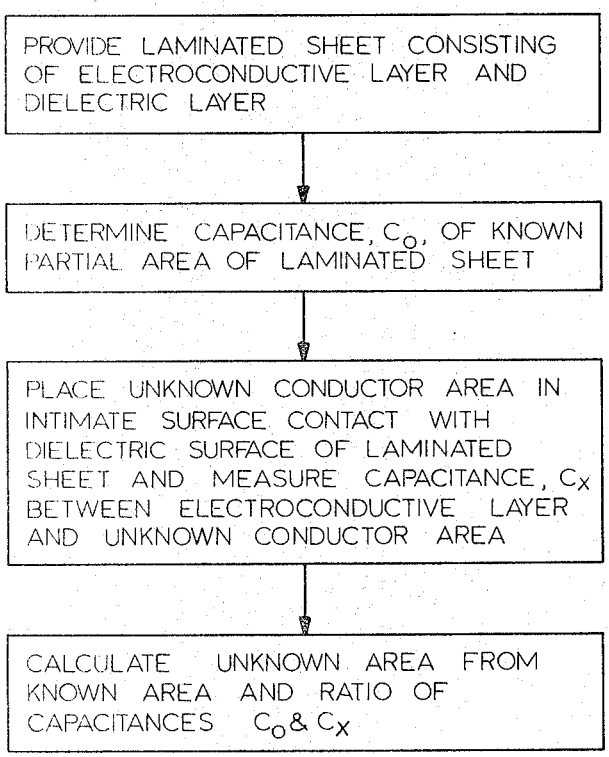
Figure 2:
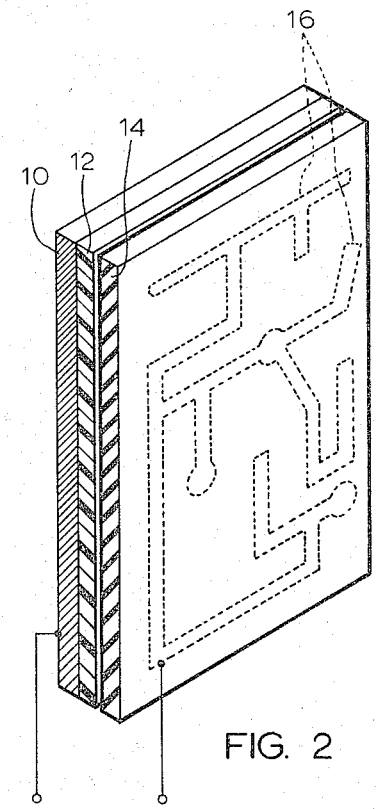

Additional objects of the invention, its advantages, scope, and the manner in which it may be practiced will be more fully apparent to persons conversant with the art from the following description of an exemplary embodiment taken in conjunction with the subjoined claims and the annexed drawing in which:

FIGURE 1 is a flow diagram setting forth the basic general steps of the method contemplated by the invention; and FIGURE 2 is a perspective elevational view, partly in section, schematically illustrating an apparatus involved in carrying out the method steps.

Referring now to the drawings, the first step of the method entails the provision of a two-layer laminated sheet (FIG. 2), one layer 10 of which is formed of electroconductive material and the other layer 12 which is a dielectric material. Conveniently, metal layer 10 may consist of a thin flat sheet of copper, aluminum or other metal having planar dimensions larger than the corresponding dimensions of a closed figure circumscribing the irregularly-shaped conductive area to be measured. Where the invention is being used specifically for the measurement of the area of a printed circuit pattern, the metal sheet would be at least as large as the printed circuit board.

For dielectric layer 12 of the laminated sheet, one half mil (.0005 inch) Mylar film (terephthalate polyester) is highly satisfactory. This material is commercially available with one surface coated with pressure-sensitive adhesive and may be applied to the metal sheet using a roller to eliminate air bubbles and secure intimate surface contact. Alternatively, plain Mylar film can be adhered to the metal plate by use of cements and procedures recommended by the manufacturer, or a thin coating of petroleum jelly (e.g., "Vaseline") can be applied to the surface of the metal plate to secure adherence of the plastic film and eliminate an air interface.

It is now necessary to determine the electrical capacitance of a known partial area of the laminated sheet. This can be accomplished conveniently by means of a small thin reference strip or bar of metal (not shown) of known area applied to the dielectric surface of the laminated sheet. In one practical embodiment of the invention, a brass strip one-eighth inch wide and four inches long (i.e., one-half square inch in area) was employed in order to approximate the usual configuration of printed circuit conductors. The conductive strip is applied to the dielectric surface using a thin coating of petroleum jelly to secure intimate surface contact devoid of any air interface. The capacitance, $C_o$, between the strip and the metal plate of the laminated sheet is then accurately measured, as by means of a capacitance bridge; as the area of the reference strip is known, it is then possible to calculate the capacitance per unit area of the laminated sheet.

After removing the reference strip, the unknown conductive area is placed against the dielectric surface of the laminated sheet, again using petroleum jelly to ensure intimate contact, and the capacitance is measured between the unknown conductive area and the metal plate. In FIGURE 2, a printed circuit board 14 having a conductor pattern 16, which constitutes the unknown area, is shown applied to the laminated sheet. When the unknown area, $A_x$, is a composite of electrically isolated segments these can be electrically interconnected, if this can be done conveniently and by means of external connections which would not affect the capacitance reading. Otherwise, individual measurements are made for each discrete segment of the conductive area and summed.

After completion of the measurements, the area, $A_x$, of printed circuit 16 may be easily calculated from the known area, $A_o$, and ratio of the capacitance, $C_o$, measured with the reference strip and with the unknown area.

Symbolically:

$$\frac{C_o}{C_x} = \frac{A_o}{A_x}$$

or $$A_x = C_x(C_o/A_o)$$

The value $C_o/A_o$, or unit capacitance, is, of course, a constant for any given equipment.

While there has been described what at present is believed to be the preferred embodiment of this invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

A method of determining the area of an irregularly-shaped electroconductive surface of a flat printed surface comprising:
  laminating a flat sheet of electroconductive material and a flat sheet of dielectric material;
  placing in intimate surface contact with the exposed surface of the sheet of dielectric material a conductive plate of known area and measuring the electrical capacitance between the plate and the electroconductive sheet;
  removing said plate and placing in intimate contact with said exposed dielectric surface the irregularly-shaped electro-conductive surface to be measured;
  measuring the electrical capacitance between said irregularly-shaped electroconductive surface and the electroconductive sheet, thereby obtaining the area of the irregularly shaped surface in terms of unit capacitance.

References Cited by the Examiner

UNITED STATES PATENTS 3,256,591  6/1966  Hardy et al. -------- 324—61 X

FOREIGN PATENTS 917,893  2/1963  Great Britain.

WALTER L. CARLSON, *Primary Examiner.*

W. H. BUCKLER, E. E. KUBASIEWICZ,
*Assistant Examiners.*